(12) United States Patent
Wang (10) Patent No.: US 11,206,444 B2
(45) Date of Patent: Dec. 21, 2021

(54) METHOD AND DEVICE FOR VIDEO PREVIEWING, ELECTRONIC EQUIPMENT, AND COMPUTER-READABLE STORAGE MEDIUM

(71) Applicant: BEIJING MICROLIVE VISION TECHNOLOGY CO., LTD, Beijing (CN)

(72) Inventor: Shuai Wang, Beijing (CN)

(73) Assignee: BEIJING MICROLIVE VISION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/009,291

(22) Filed: Sep. 1, 2020

(65) Prior Publication Data
US 2020/0396498 A1 Dec. 17, 2020

Related U.S. Application Data

(63) Continuation of application No. PCT/CN2018/125424, filed on Dec. 29, 2018.

(30) Foreign Application Priority Data

Dec. 28, 2018 (CN) .......................... 201811618005.5

(51) Int. Cl.
*H04N 21/44* (2011.01)
*H04N 21/482* (2011.01)
(Continued)

(52) U.S. Cl.
CPC ..... *H04N 21/4318* (2013.01); *H04N 21/4312* (2013.01); *H04N 21/44* (2013.01);
(Continued)

(58) Field of Classification Search
CPC ........... H04N 21/4318; H04N 21/4312; H04N 21/44; H04N 21/4438; H04N 21/47217; H04N 21/482
(Continued)

(56) References Cited

U.S. PATENT DOCUMENTS 9,152,235 B2 * 10/2015 Wardenaar .......... G06F 3/04883
2010/0262995 A1 * 10/2010 Woods ............... H04N 21/4312
725/40
(Continued)

FOREIGN PATENT DOCUMENTS

| CN | 105915979 A | 8/2016 |
| CN | 105992068 A | 10/2016 |

(Continued)

OTHER PUBLICATIONS

Zhao Dongxue, Video Playing Method, Device, terminal and storage medium, Sep. 29, 2018, IP.com; pp. 2-3 (Year: 2020).*
(Continued)

*Primary Examiner* — Nathan J Flynn
*Assistant Examiner* — Caroline Somera
(74) *Attorney, Agent, or Firm* — BakerHostetler (57) ABSTRACT

Embodiments of the present disclosure provide a method, an apparatus for previewing video, an electronic device, and a computer-readable storage medium. The method includes: determining a first video corresponding to the first video cover fully displayed in a current screen when stop of a slide on the screen is detected; playing the first video on the current screen for user previewing; jumping to a subpage corresponding to the first video and playing the first video on the subpage when a click operation to the first video is detected. According to this disclosure, users can know the specific content of the video during the previewing process, so as to determine whether they are interested in the video.

(Continued)

determining a first video corresponding to the first fully displayed video cover in a current screen when stop of a slide on the screen is detected — S101 playing the first video on the current screen — S102 jumping to a subpage corresponding to the first video and playing the first video on the subpage when a click operation to the first video is detected — S103

If they are not interested, the uses may skip it directly and continue watching the next video; else, the users may click the video to further watch the full video content, so that the users can intuitively filter the watching contents, thereby improving the user experience.

20 Claims, 2 Drawing Sheets (51) Int. Cl.
　　　*H04N 21/431*　　　(2011.01)
　　　*H04N 21/443*　　　(2011.01)
　　　*H04N 21/472*　　　(2011.01)
(52) U.S. Cl.
　　　CPC ... *H04N 21/4438* (2013.01); *H04N 21/47217* (2013.01); *H04N 21/482* (2013.01)
(58) Field of Classification Search
　　　USPC .......................................................... 725/38
　　　See application file for complete search history.

(56) References Cited

U.S. PATENT DOCUMENTS

| | | | | |
|---|---|---|---|---|
| 2012/0141095 | A1* | 6/2012 | Schwesinger | H04N 21/4316 386/290 |
| 2013/0080895 | A1* | 3/2013 | Rossman | G06F 3/04883 715/720 |
| 2014/0289629 | A1* | 9/2014 | Rossmann | G06F 16/739 715/722 |
| 2015/0037006 | A1* | 2/2015 | Tapper | H04N 9/8042 386/241 |
| 2015/0288884 | A1* | 10/2015 | Kim | H04N 5/23212 348/333.08 |
| 2016/0345052 | A1* | 11/2016 | Wang | H04N 21/47202 |
| 2016/0370982 | A1* | 12/2016 | Penha | G06F 3/04883 |
| 2017/0111681 | A1* | 4/2017 | Jiang | H04N 21/4825 |
| 2018/0019002 | A1* | 1/2018 | McIntosh | H04N 21/47217 |
| 2018/0255341 | A1* | 9/2018 | Deng | H04N 21/4722 |
| 2019/0132648 | A1* | 5/2019 | Zimmerman | H04N 21/47202 |
| 2019/0149885 | A1* | 5/2019 | Madison | G06F 16/743 715/838 |
| 2019/0339852 | A1* | 11/2019 | Tseng | G06F 3/04842 |
| 2020/0301567 | A1* | 9/2020 | Park | H04N 21/4722 |

FOREIGN PATENT DOCUMENTS

| | | | | |
|---|---|---|---|---|
| CN | 106162378 | A | 11/2016 | |
| CN | 106231437 | A | 12/2016 | |
| CN | 106534939 | * | 3/2017 | ......... H04N 21/4312 |
| CN | 107613404 | A | 1/2018 | |
| CN | 107995535 | A | 5/2018 | |
| CN | 108235086 | A | 6/2018 | |
| CN | 108377421 | * | 8/2018 | ......... H04N 21/4402 |
| CN | 108668171 | A | 10/2018 | |
| CN | 109640188 | A | 4/2019 | |
| WO | WO2017101374 | * | 2/2017 | |
| WO | WO-2017181599 | A1 * | 10/2017 | ........... H04N 21/431 |

OTHER PUBLICATIONS

International Patent Application No. PCT/CN2018/125424; Int'l Search Report; dated Sep. 19, 2019; 3 pages.

* cited by examiner

FIG. 3

METHOD AND DEVICE FOR VIDEO PREVIEWING, ELECTRONIC EQUIPMENT, AND COMPUTER-READABLE STORAGE MEDIUM

CROSS-REFERENCE TO RELATED APPLICATION

The present disclosure is a continuation of PCT International Application No. PCT/CN2018/125424, filed Dec. 29, 2018, which claims the priority of Chinese Patent Application No. 201811618005.5 filed on Dec. 28, 2018, the entire contents of which are incorporated herein by reference for all purposes.

TECHNICAL FIELD

The disclosure relates to multimedia processing technology field, and particularly relates to a method, an apparatus for previewing video, an electronic device and a computer-readable storage medium.

BACKGROUND

In recent years, the content creation of the Internet has undergone a spurt of development, far beyond the capacity we can fully accept. At this time, a Feed stream technology came into being. The Feed stream is an information stream that can be continuously updated and present contents to users, which is undoubtedly a good way to present content when there is a lot of complicated contents. The Feed stream has a simplified display structure, intuitive content elements, and refreshing interactive feedback, which greatly meets the needs of users to efficiently obtain a large amount of contents.

The Feed stream technology is combined with the emerging media environment so that video Feed stream becomes an effective means of content transmission. The user may take advantage of fragmented time to quickly obtain rich contents through a small video Feed stream, a short video Feed stream and so on, while the user may enjoy leisure and entertainment. At the same time, the user usually wants to be able to pick out the contents in which they are interested and filter out contents in which they are not interested when they watch a large number of videos, thereby obtaining the best watching experiences.

However, in the current small video Feed stream, only one cover of the small video is updated and displayed on the page when the user refreshes the screen each time. The user needs to click the cover of the small video to enter a new playing page for playing the small video, and then knows the specific contents of the small video, thereby causing some inconvenience to users.

SUMMARY

According to a first aspect of the present disclosure, a method for previewing a video is provided, the method comprises: determining a first video corresponding to a first video cover fully displayed in a current screen when stop of a slide on the screen is detected; playing the first video on the current screen for user previewing; and jumping to a subpage corresponding to the first video and playing the first video on the subpage when a click operation to the first video is detected.

According to an embodiment of the present disclosure, the playing the first video on the current screen comprises: playing the first video through a player included in a floating layer above the current screen, wherein the floating layer covers the video cover.

According to an embodiment of the present disclosure, the method further comprises: when a click operation to the first video is detected, controlling the player to stop playing the first video and hiding the floating layer.

According to an embodiment of the present disclosure, the method further comprises: before determining the first video corresponding to the first video cover fully displayed in the current screen, obtaining position of each video cover on the current screen; and determining the first video cover fully displayed based on the position of each video cover.

According to an embodiment of the present disclosure, the determining the first video corresponding to the first video cover fully displayed in the current screen comprises: determining identification information of the video cover; and determining the first video based on the identification information.

According to an embodiment of the present disclosure, the method further comprises: after playing the first video on the current screen, stopping playing the first video when a display part of the first video in the screen is not larger than a predetermined display area.

According to an embodiment of the present disclosure, the method further comprises: after playing the first video on the current screen, playing other videos corresponding to other video covers fully displayed in the current screen in sequence on the current screen after the first video is played.

According to an embodiment of the present disclosure, the method further comprises: after playing other videos corresponding to other video covers fully displayed in the current screen in sequence on the current screen, replaying the first video on the current screen after playing of the last video corresponding to the last video cover fully displayed in the current screen is finished.

According to an embodiment of the present disclosure, the playing the first video on the current screen comprises: playing the first video on loop on the current screen.

According to a second aspect of the present disclosure, an apparatus for previewing a video is provided, the apparatus comprises: a determining module, configured to determine a first video corresponding to a first video cover fully displayed in a current screen when stop of a slide on the screen is detected; a previewing module, configured to play the first video on the current screen for user previewing; and a playing module, configured to jump to a subpage corresponding to the first video and playing the first video on the subpage when a click operation to the first video is detected.

According to an embodiment of the present disclosure, the previewing module is configured to play the first video through a player included in a floating layer above the current screen, wherein the floating layer covers the video cover.

According to an embodiment of the present disclosure, the playing module is configured to: when a click operation to the first video is detected, control the player to stop playing the first video and hide the floating layer.

According to an embodiment of the present disclosure, the determining module is configured to: obtain position of each video cover on the current screen; and determine the first video cover fully displayed based on the position of each video cover.

According to an embodiment of the present disclosure, the determining module is configured to: determine identification information of the video cover; and determine the first video based on the identification information.

According to an embodiment of the present disclosure, the previewing module is configured to stop playing the first video when a display part of the first video in the screen is not larger than a predetermined display area.

According to an embodiment of the present disclosure, the previewing module is configured to play other videos corresponding to other video covers fully displayed in the current screen in sequence on the current screen after the first video is played.

According to an embodiment of the present disclosure, the previewing module is configured to replay the first video on the current screen after playing of the last video corresponding to the last video cover fully displayed in the current screen is finished.

According to an embodiment of the present disclosure, the previewing module is configured to play the first video on loop on the current screen.

According to a third aspect of the present disclosure, an electronic device is provided, the electronic device comprises: a processor and a memory, where the memory stores at least one instruction, at least one programs, code set or instruction set that, when loaded and executed by the processor, to implement the method of any one of embodiments according to the first aspect of the present disclosure.

According to a fourth aspect of the present disclosure, it provides a computer-readable storage medium for storing computer instruction, program, code set or instruction set that, when executed on a computer, causes the computer to perform the method of any one of embodiments according to the first aspect of the present disclosure.

According to this disclosure, users can know the specific content of the video during the previewing process, so as to determine whether they are interested in the video. If they are not interested, the uses may skip it directly and continue watching the next video; else, the users may click the video to further watch the full video content, so that the users can intuitively filter the watching contents, thereby improving the user experience.

BRIEF DESCRIPTION OF THE DRAWINGS

In order to explain the technical solutions in the embodiments of the present disclosure more clearly, the drawings used in the description of the embodiments of the present application will be briefly illustrated below.

DETAILED DESCRIPTION

The embodiments of the present disclosure are described in detail below, and the examples of the embodiments are illustrated in the drawings, wherein throughout the drawings, the same or similar reference numbers are used to depict the same or similar elements or elements having the same or similar functions. The embodiments described below with reference to the accompanying drawings are illustrative, and are only used to explain the present disclosure, rather than being construed as limiting the present disclosure.

Those skilled in the art should understand that the singular forms "a", "an", "said" and "the" include plural referents unless the context clearly dictates otherwise. It should be further understood that the expression "comprising" or "include" used in the specification of the present disclosure means the existence of the features, integers, steps, operations, elements and/or components, but does not preclude the existence or addition of one or more other features, integers, steps, operations, elements, components and/or combinations thereof. It should be understood when an element is referred to as being "connected to" or "coupled to" another element, it may be directly connected or coupled to the other element, or an intervening element may be present. Furthermore, the terms "connected" or "coupled" used herein may include a wireless connection or a wireless coupling. The phrase "and/or" used herein includes all or any one and all combinations of one or more of the associated listed items.

Figure 1:
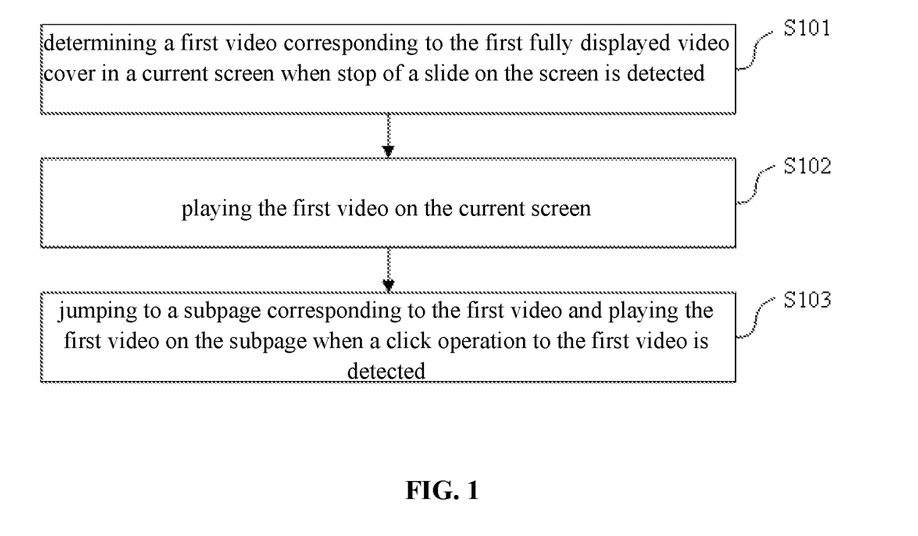
FIG. 1 is a schematic flowchart of a method for previewing a video according to an embodiment of the present disclosure.

An embodiment of the present disclosure provides a method for previewing a video. As shown in FIG. 1, the method may include the following steps.

Step S101: a first video corresponding to the first video cover fully displayed in a current screen is determined when stop of a slide on the screen is detected.

For the embodiment of the present disclosure, the method may be performed by a terminal device, such as a mobile terminal, or a client installed on the terminal device. In practical applications, the mobile terminal may include, for example, a mobile phone, a smart phone, a tablet computer, a notebook computer, a personal digital assistant, a portable multimedia player, a navigation device, and the like. Those skilled in the art can understand that, in addition to elements particularly used for mobile purposes, the configuration according to embodiments of the present disclosure can also be applied to a fixed type terminal such as a digital television, a desktop computer, and the like. In the following, the client is taken as an example for illustration.

Specifically, the interface (screen) interaction can be achieved according to a user's slide operations, for example, a slide-down operation may refresh the screen, and for example, a slide-up operation causes the screen slide. The screen may include, but is not limited to, a real-time display screen such as a list screen. In actual application, one slide operation or multiple continuous slide operations performed by the user may achieve stopping the slide of the screen once. In the embodiment of the present disclosure, the slide state of the screen is detected, and when the slide of the screen is stopped each time (that is, the slide stop state reached after the user's slide operation), the first video corresponding to the first video cover fully displayed in a current screen is determined.

The video in the embodiment of the present application may be a small video and a short video and any video suitable for the Feed stream, and the specific form of the video is not limited herein.

Step S102: the first video is played on the current screen for user previewing.

In the embodiment of the present disclosure, the first video is directly played on the current screen so that the user may preview contents of the video. Then, in order to improve the previewing efficiency and save playing resources, the video may be played at a high speed, or only pictures of the video are played without playing the sound of the video. Alternatively, the entire contents of the first video may also be directly played. It is not limited in the embodiment of the present disclosure.

Furthermore, the users can know the specific content of the small video during the previewing process, so as to determine whether they are interested in the video. If they are not interested, the uses may skip it directly and continue watching the next video; else, the users may click the video to further watch the full video content, that is, proceeding to step S103.

Step S103: it may jump to a subpage corresponding to the first video and play the first video on the subpage when a click operation to the first video is detected.

Optionally, the first video may be replayed on the subpage, or the first video may continue to be played on the subpage based on the playing progress of step S102. It is not limited in the embodiments of the present disclosure.

The method for previewing the video provided by the embodiments of the present disclosure can achieve the purpose of allowing users to intuitively filter the watching contents, thereby improving the user experience.

With regard to the embodiments of the present disclosure, in practical applications, the playing of videos needs to depend on a player, and a client usually has only one player, so it can only play the content of one video at the same time. Then in step S102, when the first video is played on the current screen, the transparent player carried in the subpage in the prior art must be presented on the main page, and it needs to handle the relationship between the playing of the player on the current page and the playing of the player on the subpage. For example, when playing a video on the current page, if the user clicks on the currently playing video to enter the corresponding subpage, it must ensure that the player on the current page is not in conflict with the player on the subpage.

The embodiment of the present disclosure provides a feasible implementation manner. In step S102, the first video is played through a player included in a floating layer above the current screen, wherein the floating layer covers the video cover.

In the specific implementation process, the following steps can be included.

Step S1021: a floating layer containing a player is created on the current screen.

Step S1022: the floating layer is controlled to be displayed.

Step S1023: the first video is played through the player.

In step S1022, it needs to determine the position where the floating layer is to be displayed. In the embodiment of the present disclosure, in order to make the user not perceive the existence of the floating layer and the player to achieve the smoothest previewing effect, the floating layer covers the video cover. Therefore, it is determined where the floating layer is to be displayed, that is, the position of the video cover, and the floating layer is controlled to be displayed at the position of the video cover.

In the embodiment of the present disclosure, the player and/or the floating layer may be transparent, so that the user cannot perceive the existence of the floating layer and the player for achieving the smoothest previewing effect.

Further, in step S103, when a click operation to the first video is detected, the method further includes: controlling the player to stop playing the first video and hiding the floating layer, and then jumping to a subpage corresponding to the first video and playing the first video on the subpage.

In practical applications, the step of hiding the floating layer and the step of jumping to the subpage corresponding to the first video may also be performed simultaneously, as long as the player on the current page stops playing the video and is turned off before it plays the first video on the subpage, it may avoid the player on the current page being in conflict with the player on the subpage, thereby achieving smooth playing effects.

In the embodiment of the present disclosure, with regard to step S101, in practical applications, there may be a plurality of video covers in the current screen, for example, there is a video cover of which a top part has already slipped out of the current screen, or there are multiple parallel or side-by-side video covers fully displayed. Therefore, it needs to determine which video is the first video that the method for previewing the video provided by the embodiment of the present disclosure is directed to.

Specifically, before step S101, position of each video cover on the current screen is obtained; and the first video cover fully displayed is determined based on the position of each video cover.

In a possible implementation manner, the coordinate information of each video cover of the current screen is obtained, for example, the coordinates of the four vertices of the video cover. At this time, the video cover fully displayed can be determined directly based on the coordinates of the four vertices of each video cover. Then, it may determine which video cover is in the first position among these video covers according to the coordinate information.

In another possible implementation manner, the coordinate information of one of the vertices corresponding to each video cover on the current screen is obtained, and then it may determine which video cover is the first video cover fully displayed according to the displayed length and width of each video cover.

In practical applications, if the video Feed streams are arranged in a column, the first video cover fully displayed may be the video cover fully displayed in the top of the current screen; if the video Feed streams are arranged in multiple columns, the first video cover fully displayed may be the video cover fully displayed in the top of the current screen, or may be the video cover fully displayed in the top left of the current screen, and so on. It may be set by those skilled in the art according to actual situations, and the embodiments of the present disclosure are not limited here.

Further, after determining the first video cover fully displayed, in step S101, identification information of the video cover is determined; and the first video is determined based on the identification information.

As an example, each video cover has an ID. After the first video cover fully displayed is determined, the ID of the video cover is obtained, and the video source corresponding to the ID is found; the video is obtained from the video source and is played in the player.

In practical applications, the identification information of the video cover may also be identification information other than the ID, which is not limited in the embodiment of the present disclosure.

In the embodiment of the present application, if the user determines that he or she is not interested in the content of the video according to the video previewed on the current screen, the user may slide the screen during the video playing on the current main page. The embodiment of the present disclosure provides a possible implementation, for example, during playing the first video on the current screen, when it is detected that a display part of the first video in the screen is not larger than a predetermined display area, it may stop playing the first video.

In actual application, the trigger point of the detection action may be a slide on the screen. As compared to step S101 of the present disclosure, it may determine the action of detecting the stop of slide in the step S101 or perform the action of detecting the display area of the first video on the screen in the step by setting the slide information such as the distance and speed of the slide. In actual application, it may firstly perform the action of detecting the display area of the first video on the screen in this step, and then perform the action of detecting the stop of slide in step S101, and thereby play the first video on the new page after the screen sliding. It may be set by a person skilled in the art according to actual situations, and the embodiments of the present disclosure are not limited here.

In addition, the embodiment of the present disclosure does not limit the above predetermined display area. For example, the predetermined display area may be a predetermined ratio threshold of a fully displayed area of the video cover, for example, 50%, or a fixed value. In practical applications, the display area of the video can also be determined according to the height of the video display part, that is, it may determine whether to continue to play the first video according to the height ratio threshold or the fixed value of the height, which also belongs to the scope of the spirit of the embodiments of the present disclosure.

Since there may be a plurality of video covers in the current screen, the present disclosure may also provide a possible implementation manner suitable for a scenario in which video Feed streams are arranged in multiple columns. Specifically, step S102 further includes playing other videos corresponding to other video covers fully displayed in the current screen in sequence on the current screen after the first video is played.

That is, after playing the first video of the current screen, the second video is played, such as the video on the right or lower side, or the like. Those skilled in the art can set the order of playing videos according to the actual situations until all the videos on the current page are played.

The method for previewing other videos corresponding to other video covers is the same as or similar to the above description of the method for previewing the first video, which is not repeated in the embodiment of the present disclosure.

Further, the first video may be replayed on the current screen after playing of the last video corresponding to the last video cover fully displayed in the current screen is finished.

That is, after playing the last video on the current page, it may jump to the first video on the current page to continue playing the video, and then loop back and forth.

In actual applications, it also may set specific buttons or gestures to let users select the video for previewing, so as to achieve more convenient previewing effect.

The embodiments of the present disclosure may also provide a possible implementation manner, which is applicable to a scenario in which video Feed streams are arranged in a single column. Specifically, the first video is played on loop on the current screen. By sliding the screen, the user may preview the specific content of each video, which can also achieve the purpose of allowing the user to intuitively filter the watching content, thereby improving the user experience.

According to the embodiments of the present disclosure, the users can know the specific content of the video during the previewing process, so as to determine whether they are interested in the video. If they are not interested, the uses may skip it directly and continue watching the next video; else, the users may click the video to further watch the full video content, so that the users can intuitively filter the watching contents, thereby improving the user experience.

Figure 2:
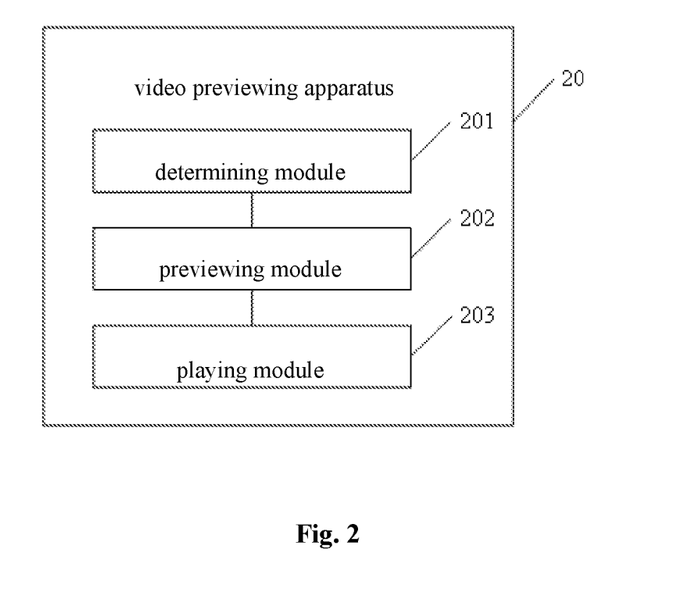
FIG. 2 is a schematic structural diagram of an apparatus for previewing a video according to an embodiment of the present disclosure.

An embodiment of the present disclosure further provides an apparatus for previewing a video. As shown in FIG. 2, the apparatus 20 may include a determining module 201, a previewing module 202, and a playing module 203.

The determining module 201 is configured to determine a first video corresponding to the first video cover fully displayed in a current screen a when stop of a slide on the screen is detected.

The previewing module 202 is configured to play the first video on the current screen for user previewing.

The playing module 203 is configured to jump to a subpage corresponding to the first video, and play the first video on the subpage when a click operation to the first video is detected.

In an optional implementation manner, the previewing module 202 is configured to play the first video through a player included in a floating layer above the current screen, wherein the floating layer covers the video cover.

In an optional implementation manner, the playing module 203 is configured to: control the player to stop playing the first video and hide the floating layer when a click operation to the first video is detected.

In an optional implementation manner, the determining module 201 is configured to: obtain position of each video cover on the current screen; and determine the first video cover fully displayed based on the position of each video cover.

In an optional implementation manner, the determining module 201 is configured to: determine identification information of the video cover; and determine the first video based on the identification information.

In an optional implementation manner, the previewing module 202 is configured to stop playing the first video when a display part of the first video in the screen is not larger than a predetermined display area.

In an optional implementation manner, the previewing module 202 is configured to play other videos corresponding to other video covers fully displayed in the current screen in sequence on the current screen after the first video is played.

In an optional implementation manner, the previewing module 202 is configured to replay the first video on the current screen after playing of the last video corresponding to the last video cover fully displayed in the current screen is finished.

In an optional implementation manner, the previewing module 202 is configured to play the first video on loop on the current screen.

The apparatus for previewing a video provided by the embodiments of the present disclosure may be specific hardware on the device or software or firmware installed on the device. The implementation principle and technical effect of the apparatus are the same as the foregoing method embodiments. For brief description, the device implementation of which a part is not mentioned in the examples, please refer to the corresponding content in the foregoing method embodiments, which will not be repeated here.

Based on the same principle as the apparatus for previewing a video in the embodiment of the present disclosure, an embodiment of the present disclosure further provides an electronic device. The electronic device includes a memory and a processor. The memory stores at least one instructions, at least one programs, code set or instruction set that, when loaded and executed by the processor, to implement the method of any one of embodiments of the present disclosure.

Based on the same principle as the apparatus for previewing a video in the embodiment of the present disclosure, an embodiment of the present disclosure further provides a computer-readable storage medium for storing computer instruction, program, code set or instruction set that, when executed on a computer, causes the computer to perform the method of any one of embodiments of the present disclosure.

Figure 3:
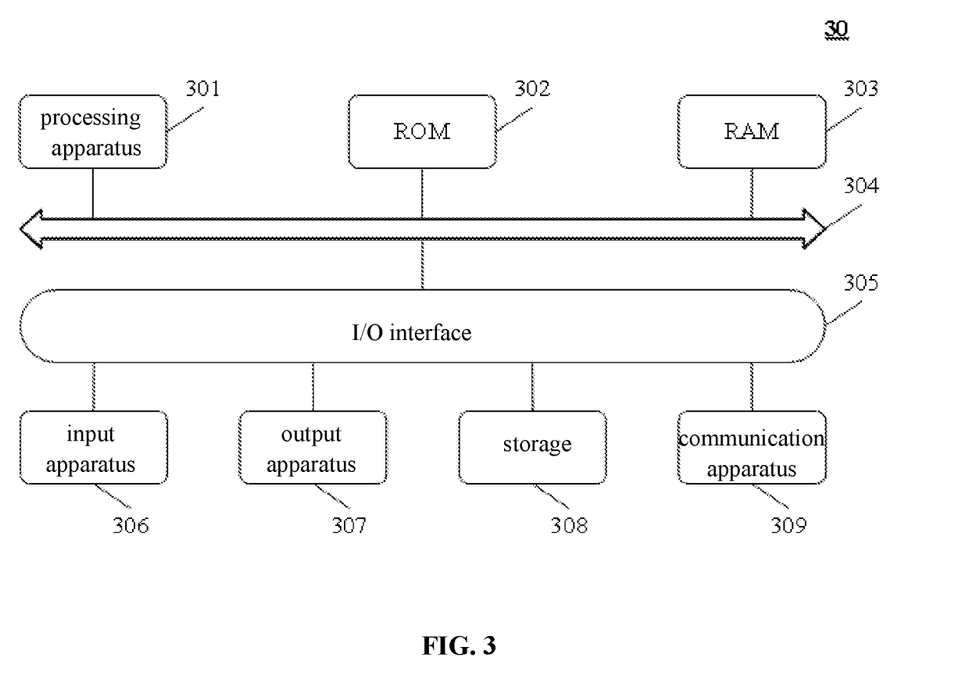
FIG. 3 is a schematic structural diagram of an electronic device according to an embodiment of the present disclosure.

Reference is made to FIG. 3 below. FIG. 3 illustrates a schematic structural diagram of an electronic device 30 (such as a terminal device corresponding to FIG. 1) that is suitable for implementing the embodiments of the present disclosure. The electronic device in the embodiment of the present disclosure may include, but is not limited to, a mobile terminal, such as a mobile phone, a notebook computer, a digital broadcast receiver, a personal digital assistant (PDA), a portable android device (PAD), a portable multimedia player (PMP), an on-vehicle terminal (for example, a on-vehicle navigation terminal) and the like, as well as a fixed terminal such as digital TV, a desktop computer and the like. The electronic device shown in the FIG. 3 is merely an example, and then should not construct any limitation on the function and scope of use of the embodiments of the present disclosure.

As shown in FIG. 3, the electronic device 300 may include a processing apparatus (e.g., a central processing unit, a graphics processor, etc.) 301 that may execute various actions and processing according to the program stored in the read-only memory (ROM) 302 or program loaded from a storage 308 to a random access memory (RAM) 303. The RAM 303 also stores various programs and datas required for the operation of the electronic device 300. The processing apparatus 301, the ROM 302, and the RAM 303 are connected to each other through a bus 304. An input/output (I/O) interface 305 is also connected to the bus 304.

In general, the following apparatus may be connected to the I/O interface 305: an input apparatus 306 including, for example, a touch screen, a touch pad, a keyboard, a mouse, a camera, a microphone, an accelerometer, a gyroscope and the like; an output apparatus 307 including, for example, a liquid crystal display (LCD), a speaker, a vibration and the like; a storage 308 including, for example, a magnetic tape and a hard disk and the like; and a communication apparatus 309. The communication apparatus 309 may allow the electronic device 300 to exchange data with other devices by wirelessly or wires communication. Although FIG. 3 illustrates an electronic device 300 having various apparatus, it should be understood it is not required to implement or have all the illustrated apparatuses. Alternatively, it may include more or less apparatuses.

In particular, the processes described above with reference to the flowcharts may be implemented as a computer software program according to an embodiment of the present disclosure. For example, an embodiment of the present disclosure includes a computer program product comprising a computer program loaded on a computer-readable medium, and the computer program contains program codes for executing the method shown in the flowchart. In such an embodiment, the computer program may be downloaded and installed from the network via the communication apparatus 309, or installed from the storage 308, or installed from the ROM 302. When the computer program is executed by the processing apparatus 301, the above functions defined in the method of the embodiments of the present disclosure are executed.

It should be noted that the above computer-readable medium of the present disclosure may be a computer-readable signal medium or a computer-readable storage medium or any combination of the above two. The computer-readable storage medium may be, for example, but is not limited to, an electronic, magnetic, optical, electromagnetic, infrared, or semiconductor system, apparatus, or device, or any combination of the above. More specific examples of the computer-readable storage media may include, but are not limited to, electrical connection having one or more wires, portable computer disk, hard disk, random access memory (RAM), read-only memory (ROM), erasable and programmable read-only memory (EPROM or flash memory), optical fiber, portable compact disk read-only memory (CD-ROM), optical storage device, magnetic storage device, or any suitable combination of the above. In the present disclosure, a computer-readable storage medium may be any tangible medium that may contain or store programs, which may be used by or in connection with an instruction execution system, apparatus, or device. In the present disclosure, a computer-readable signal medium may include a data signal that is propagated in the baseband or propagated as part of a carrier, carrying computer-readable program codes. Such propagated data signals may take various forms, which includes, but is not limited to, electromagnetic signals, optical signals, or any suitable combination of the above. The computer-readable signal medium may also be any computer-readable medium except for a computer-readable storage medium, and the computer-readable signal medium may transmit, propagate or transport a program for use by or in connection with an instruction execution system, apparatus or device. Program codes contained on the computer readable medium may be transmitted by any suitable medium, which includes but is not limited to, wire, fiber optic cable, radio frequency (RF), and the like, or any suitable combination of the above.

The above computer readable medium may be contained in the above electronic device; or may be separately present and is not incorporated in the electronic device.

The computer readable medium carries one or more programs, when the one or more programs are executed by the electronic device, causing the electronic device to: determine a first video corresponding to the first video cover fully displayed in a current screen when stop of a slide on the screen is detected; play the first video on the current screen for user previewing; jump to a subpage corresponding to the first video and play the first video on the subpage when a click operation to the first video is detected.

Computer program codes for executing the operations of the present disclosure may be written in one or more programming languages, or combinations thereof, wherein the programming languages includes an object-oriented programming language such as Java, Smalltalk, C++, and also includes conventional procedural programming language—such as "C" language or similar programming languages. The program codes may be executed entirely on the user's computer, partly executed on the user's computer, executed as an independent software package, partly executed on the user's computer and partly executed on the remote computer, or entirely executed on the remote computer or on the server. In the case of involving the remote computer, the remote computer may be connected to the user's computer through any kind of network, including a local area network (LAN) or a wide area network (WAN), or may be connected to an external computer (e.g., using an Internet service provider to connect via Internet).

The flowchart and block diagrams in the drawings illustrate the architecture, function, and operation of possible implementations of systems, methods, and computer program products according to various embodiments of the present disclosure. In this regard, each block of the flowchart or block diagram may represent one module, a program segment, or a portion of the codes, and the module, the program segment, or the portion of codes includes one or more executable instructions for implementing the specified logic functions. It should also be noted that in some alternative implementations, the functions noted in the blocks may also occur in an order different from the order noted in the drawings. For example, two successively represented blocks may in fact be executed substantially in parallel, and they may sometimes be executed in the opposite order, depending upon the involved function. It is also noted that each block of the block diagrams and/or flowcharts, and combinations of blocks in the block diagrams and/or flowcharts, may be implemented in a dedicated hardware-based system that executes the specified functions or operations, or it may be implemented by a combination of dedicated hardware and computer instructions.

The above description is only a preferred embodiment of the present disclosure and a description of the principles of the applied technology. It should be understood by those skilled in the art that the disclosure scope of the present disclosure is not limited to the specific technical solutions of the above technical features, and should also cover other technical solutions formed by the random combination of the above technical features or equivalent features thereof without departing from the above disclosed concept, such as a technique solution in which the above features are replaced with technical features having similar functions disclosed (but is not limited) in the present disclosure.

It should be understood although the each of steps in the flowchart of the drawings are sequentially shown as the arrows, these steps are not necessarily performed in the order indicated by the arrows. Unless otherwise expressly stated herein, the implementation of these steps is not strictly limited in the order, and they may be performed in other orders. Moreover, at least some of the steps in the flowchart of the drawings may include a plurality of sub-steps or stages, and the plurality of sub-steps or stages are not necessarily performed at the same time, but may be performed at different times, and the plurality of sub-steps or stage are not necessary to be performed sequentially, but may be performed alternately with at least a portion of other steps or sub-steps or stages of other steps.

The above descriptions are only a portion of the embodiments of the present disclosure, and it should be noted that those skilled in the art can make several improvements and modifications without departing from the principles of the present disclosure. These improvements and modifications should be considered to fall with the scope of protection of the present disclosure.

What is claimed is:

1. A method for previewing a video, comprising:
   determining a plurality of video covers, wherein the plurality of video covers are fully displayed on a current screen;
   determining a first video cover among the plurality of video covers, wherein the first video cover is in a first place among the plurality of video covers;
   determining a first video corresponding to the first video cover;
   playing the first video on the current screen for user previewing;
   in response to determining that a display area of the first video on the current screen is not greater than a predetermined threshold, stopping playing the first video; and
   in response to detecting a click operation on the first video, jumping to a subpage corresponding to the first video and playing the first video on the subpage.

2. The method for previewing the video according to claim 1, wherein the playing the first video on the current screen comprises:
   playing the first video through a player included in a floating layer above the current screen, wherein the floating layer covers the video cover.

3. The method for previewing the video according to claim 2, further comprising:
   when the click operation to the first video is detected, controlling the player to stop playing the first video and hiding the floating layer.

4. The method for previewing the video according to claim 1, further comprising:
   obtaining position of each video cover on the current screen; and
   determining the first video cover based on the position of each video cover.

5. The method for previewing the video according to claim 1, wherein the determining a first video corresponding to the first video cover further comprises:
   determining identification information of the first video cover; and
   determining the first video based on the identification information.

6. The method for previewing the video according to claim 1, further comprising:
   after playing the first video on the current screen, playing other videos corresponding to other video covers among the plurality of video covers in sequence on the current screen.

7. The method for previewing the video according to claim 6, further comprising:
   after playing the other videos corresponding to the other video covers, replaying the first video on the current screen after playing of a last video corresponding to a last video cover among the other video is finished.

8. The method for previewing the video according to claim 1, wherein the playing the first video on the current screen further comprises:
   playing the first video on a loop on the current screen.

9. An electronic device, comprising:
   a processor and a memory, wherein the memory stores instructions that upon execution by the processor cause the electronic device to perform operations, the operations comprising:
   determining a plurality of video covers, wherein the plurality of video covers are fully displayed on a current screen;
   determining a first video cover among the plurality of video covers, wherein the first video cover is in a first place among the plurality of video covers;
   determining a first video corresponding to the first video cover;
   playing the first video on the current screen for user previewing;
   in response to determining that a display area of the first video on the current screen is not greater than a predetermined threshold, stopping playing the first video; and
   in response to detecting a click operation on the first video, jumping to a subpage corresponding to the first video and playing the first video on the subpage.

10. A non-transitory computer-readable storage medium, storing computer instructions that, when executed on a computer, cause the computer to perform operations comprising:

determining a plurality of video covers, wherein the plurality of video covers are fully displayed on a current screen;

determining a first video cover among the plurality of video covers, wherein the first video cover is in a first place among the plurality of video covers;

determining a first video corresponding to the first video cover;

playing the first video on the current screen for user previewing;

in response to determining that a display area of the first video on the current screen is not greater than a predetermined threshold, stopping playing the first video; and in response to detecting a click operation on the first video, jumping to a subpage corresponding to the first video and playing the first video on the subpage.

11. The electronic device of claim 9, the operations further comprising:

playing the first video on the current screen through a player included in a floating layer above the current screen, wherein the floating layer covers the first video cover.

12. The electronic device of claim 11, the operations further comprising:

in response to detecting the click operation on the first video, controlling the player to stop playing the first video and hiding the floating layer.

13. The electronic device of claim 9, wherein the determining a first video corresponding to the first video cover further comprises:

determining identification information of the first video cover; and determining the first video based on the identification information.

14. The electronic device of claim 9, the operations further comprising:

after playing the first video on the current screen, playing other videos corresponding to other video covers among the plurality of video covers in sequence on the current screen.

15. The electronic device of claim 14, the operations further comprising:

after playing the other videos corresponding to the other video covers, replaying the first video on the current screen after playing a last video corresponding to a last video cover among the other video covers is finished.

16. The electronic device of claim 9, wherein the playing the first video on the current screen further comprises:

playing the first video on a loop on the current screen.

17. The non-transitory computer-readable storage medium of claim 10, the operations further comprising:

playing the first video on the current screen through a player included in a floating layer above the current screen, wherein the floating layer covers the first video cover.

18. The non-transitory computer-readable storage medium of claim 17, the operations further comprising:

in response to detecting the click operation on the first video, controlling the player to stop playing the first video and hiding the floating layer.

19. The non-transitory computer-readable storage medium of claim 10, wherein the determining a first video corresponding to the first video cover further comprises:

determining identification information of the first video cover; and determining the first video based on the identification information.

20. The non-transitory computer-readable storage medium of claim 10, the operations further comprising:

playing the first video on a loop on the current screen.

* * * * *